US009710524B2

(12) United States Patent
Kaburagi et al.

(10) Patent No.: US 9,710,524 B2
(45) Date of Patent: Jul. 18, 2017

(54) IMAGE PROCESSING APPARATUS, IMAGE PROCESSING METHOD, AND COMPUTER-READABLE STORAGE MEDIUM

(71) Applicant: CANON KABUSHIKI KAISHA, Tokyo (JP)

(72) Inventors: Hiroshi Kaburagi, Yokohama (JP); Teruya Inoue, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 422 days.

(21) Appl. No.: 13/789,136

(22) Filed: Mar. 7, 2013

(65) Prior Publication Data
US 2013/0198173 A1 Aug. 1, 2013

Related U.S. Application Data

(63) Continuation of application No. 12/403,721, filed on Mar. 13, 2009, now Pat. No. 8,412,705.

(30) Foreign Application Priority Data

Mar. 14, 2008 (JP) .................... 2008-066054

(51) Int. Cl.
*G06F 17/30* (2006.01)

(52) U.S. Cl.
CPC .. *G06F 17/30554* (2013.01); *G06F 17/30247* (2013.01)

(58) Field of Classification Search
CPC .................................. G06F 17/30554
USPC ....... 707/706, 722, 724–728, 731, 732, 735, 707/736, 758, 781, 805, 999.003, 707/999.102; 345/629, 473; 386/95
See application file for complete search history.

(56) References Cited

U.S. PATENT DOCUMENTS

| 2003/0107586 A1* | 6/2003 | Takiguchi et al. ............ 345/629 |
| 2004/0054659 A1* | 3/2004 | McIntyre .......... G06F 17/30247 |
| 2009/0083797 A1* | 3/2009 | Yoon et al. ..................... 725/43 |
| 2009/0112967 A1* | 4/2009 | Amano et al. ................ 709/201 |

FOREIGN PATENT DOCUMENTS

| JP | 2000-076268 A | 3/2000 |
| JP | 2002-063172 A | 2/2002 |
| JP | 2003-271437 A | 9/2003 |
| JP | 2006-018498 A | 1/2006 |
| JP | 2006-040295 A | 2/2006 |
| JP | 2007-102767 A | 4/2007 |
| JP | 2007-304704 A | 11/2007 |
| WO | 2006/026567 A2 | 3/2006 |

* cited by examiner

*Primary Examiner* — Syling Yen
(74) *Attorney, Agent, or Firm* — Canon USA, Inc. I.P. Division

(57) ABSTRACT

An image processing apparatus includes a search unit configured to search for an object, a selection unit configured to select a plurality of objects from among objects searched for by the search unit based on an instruction by a user, a creation unit configured to create a new document using the plurality of objects selected by the selection unit, and a storage unit configured to store the plurality of objects used in creating the new document by the creation unit as a group, associated with information about the group. The search unit searches for an object related to an object searched for based on a keyword, using information about the group.

4 Claims, 18 Drawing Sheets

FIG. 5
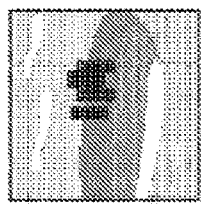
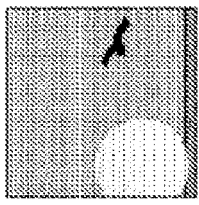
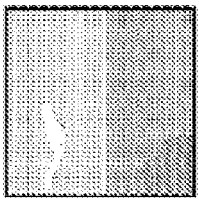
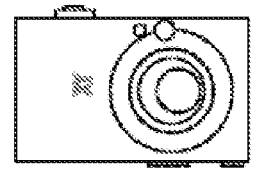
(This text object is a sample.) The camera covers a wide range of photographic situations by providing users with a plurality of shooting modes. With 9-point AF, the camera automatically focuses on the subject, even when it is off-center.
XY DIGITAL 55
CAPTURE YOUR STYLE

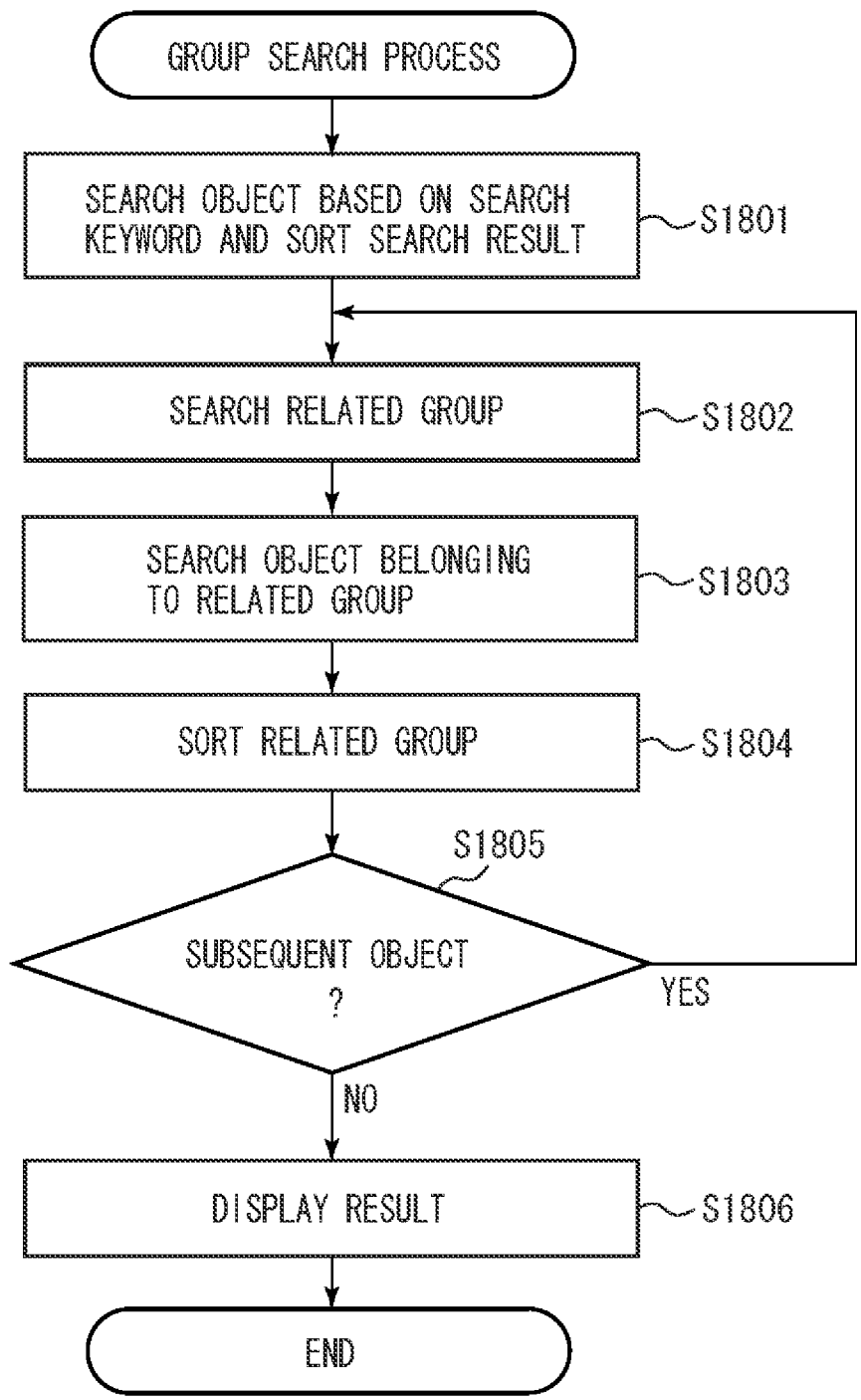

IMAGE PROCESSING APPARATUS, IMAGE PROCESSING METHOD, AND COMPUTER-READABLE STORAGE MEDIUM

CROSS REFERENCE OF RELATED APPLICATIONS

This application is a continuation of U.S. application Ser. No. 12/403,721 filed Mar. 13, 2009 which claims priority from Japanese Patent Application No. 2008-066054 filed Mar. 14, 2008, each of which is hereby incorporated by reference herein in its entirety.

BACKGROUND OF THE INVENTION

Field of the Invention

The present invention generally relates to a technique that improves searchability and operability of a plurality of objects extracted from a document image, so that the user can relatively easily reuse the plurality of objects.

Description of the Related Art

Recent copying machines have rapidly become multi-functional by digitization of image processing performed inside the machines. Examples of such functions are a copy function for copying a document, a page-description language (PDL) print function that allows printing of a document created by a host computer, and a send function for sending a scanned document to outside the copying machine via a network. Further, there is a BOX function (a storage function) that stores a document image generated for copying or PDL printing in a hard disk inside the copying machine, so that the user can reuse the document image. Further, there is an edit function for editing a document image stored inside the copying machine using the BOX function to perform an image composition, book binding, and the like. As described above, recent copying machines include various such functions.

There is also a market demand for high image quality, and in response, image processing resolution of copying machines has been increased from 600 dpi to 1200 dpi, and further to 2400 dpi as a result of seeking high reproducibility. The bit number of signals has also been increased from 8 bits to 10 bits and further to 12 bits. As a result, it may be necessary to add a memory or a storage device and to upgrade the central processing unit (CPU) to one having a higher performance, to allow for internal processing of bitmap data having a large information amount. Therefore, there can be a significant increase in the cost of the devices and their development.

A technique exists for storing a read document that is segmented into object units, in order that it may be more easily reused. Japanese Patent Application Laid-Open No. 06-162104 discusses segmenting photographs and graphs in a document into document elements and registering the document elements, so that they can be searched and displayed. Further, Japanese Patent Application Laid-Open No. 2006-146486 discusses converting each component in a document into vector data and creating a file in a file format appropriate for each component.

There is also a method for displaying data, such as an image, registered in a database as a list that is easily viewable. For example, Japanese Patent Application Laid-Open No. 05-257788 discusses creating small-size and large-size reduced images of card data registered in a database. The display of reduced images is switched as appropriate, and a link is provided between the cards.

Further, Japanese Patent Application Laid-Open No. 2000-040142 discusses allowing a user to designate the number of images to be displayed, and the images can be displayed by scaling to a size suitable for the display area regardless of the original image size.

When the user reuses a segmented object (e.g., a document element), it may be the case that the user may create a new text by combining a plurality of objects. Further, when the user reuses the objects, the user may use the same combination of objects. However, the above-described conventional techniques do not consider such features.

SUMMARY OF THE INVENTION

According to an aspect of the present invention, an image processing apparatus is provided that includes a search unit configured to search for an object, a selection unit configured to select a plurality of objects from among objects searched for by the search unit based on an instruction by a user, a creation unit configured to create a new document using the plurality of objects selected by the selection unit, and a storage unit configured to store the plurality of objects used in creating the new document by the creation unit as a group, associated with information about the group. The search unit searches for an object related to an object searched for based on a keyword, using information about the group.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain principles of the invention.

FIG. 5 illustrates an example of a document that is to be read whose objects are segmented.

FIG. 18 is a flowchart illustrating an example of a group search process according to an exemplary embodiment of the present invention.

DETAILED DESCRIPTION OF THE EMBODIMENTS

Various exemplary embodiments, features, and aspects of the invention will be described in detail below with reference to the drawings.

Figure 1:
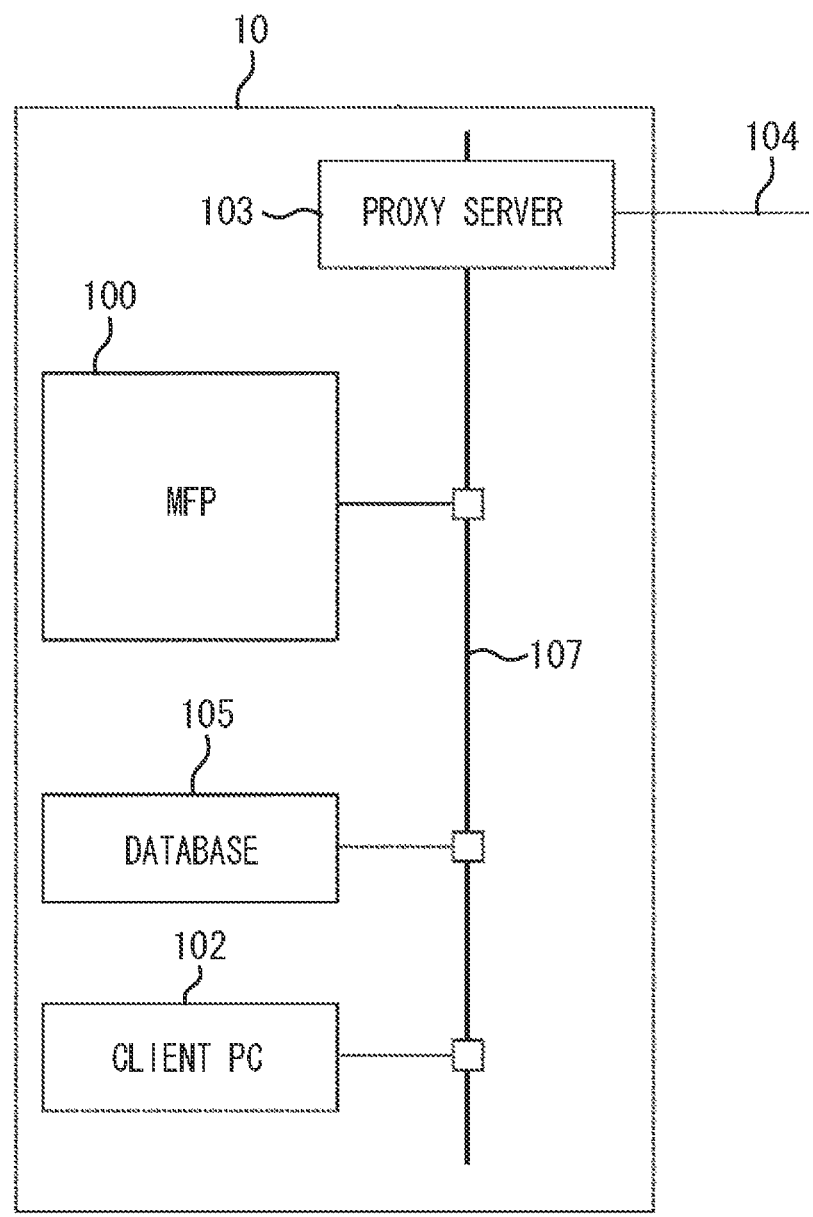
FIG. 1 is a block diagram illustrating an example of a configuration of an image processing system according to a first exemplary embodiment of the present invention.

FIG. 1 is a block diagram illustrating an example of a configuration of an image processing system 10 according to the first exemplary embodiment of the present invention. The configuration illustrated in FIG. 1 is only an example, and aspects of the present invention are not intended to be limited to this configuration.

In the image processing system 10 according to this embodiment, a local area network (LAN) 107 provided in an office is connected to a network 104 such as the Internet via a proxy server 103. An MFP 100 including various types of functions (e.g., at least one of a copy function, print function, and send function), a client personal computer (PC) 102 that can communicate with the MFP 100, a database 105, and the proxy server 103 are connected to the LAN 107.

The client PC 102 includes standard components (e.g., CPU, random access memory (RAM), read-only memory (ROM), hard disk, external storage device, display, keyboard, and mouse) provided in a general-purpose computer.

Figure 2:
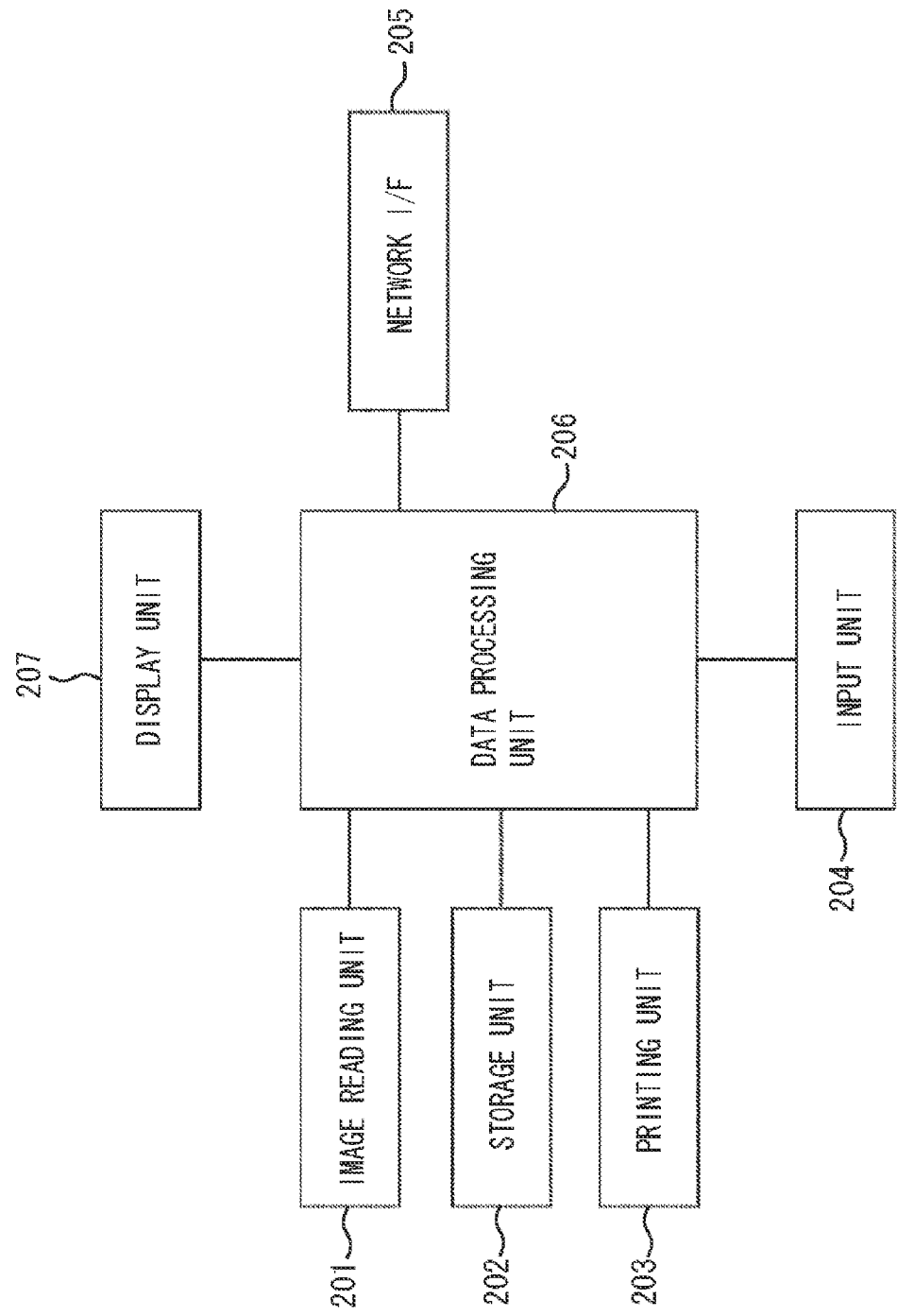
FIG. 2 is a block diagram illustrating in detail an example of a configuration of a multifunction peripheral (MFP) according to the first exemplary embodiment of the present invention.

FIG. 2 is a block diagram illustrating in detail an example of a configuration of the MFP 100 according to the first exemplary embodiment of the present invention.

Referring to the example shown in FIG. 2, an image reading unit 201 (scanner) including an auto document feeder (ADF), reads a document image that may include a plurality of pages or a single page. As a result, the image reading unit 201 can acquire bitmap data of a predetermined resolution (such as 600 dpi).

A printing unit 203 according to this example includes a copy function for printing an image corresponding to the read image signal on a recording medium. When the MFP 100 copies one document image, a data processing unit 206 processes the read image signal to generate a recording signal for printing on the recording medium. On the other hand, when the MFP copies a single-page document image to obtain a plurality of copies, the MFP 100 may temporarily store the recording signal corresponding to the page in a storage unit 202. The MFP 100 then outputs the stored recording signal a plurality of times to the printing unit 203 and prints it on the recording medium.

A network interface (I/F) 205 may be used to transmit object data to the database 105, which is converted by a process described below from the bit map data acquired from the image reading unit 201. The network I/F 205 may also be used to receive the object data stored in the database 105 for reusing the data, and to transmit the converted object data to the client PC 102. Further, the network I/F 205 may be used to transmit an image file to the client PC, which is converted from the object data into an image file of a vector data file format, such as at least one of an extended markup language (XML), Paper Specification (XPS), and a Page Description File (PDF).

The data processing unit 206 according to this example receives the print data from the client PC 102 via the network I/F 205 and converts the received print data into a recording signal that can be printed by the printing unit 203. The printing unit 203 then forms an image on the recording medium based on the recording signal.

A user may input instructions from an input unit 204, and the data processing unit 206 may perform control of executing various processes based on the input instructions. Such operations may be controlled by a control unit (such as a CPU) in the data processing unit 206. Further, a display unit 207 may display a status of a user input, and image data when the user searches an image or performs an editing process.

The storage unit 202 may include a hard disk that stores object data acquired by a process to be described below, and an image processing buffer memory used when the data processing unit 206 executes various image processing. Further, the storage unit 202 may include an image editing buffer memory used when the data processing unit 206 performs image editing based on the object data.

Figure 3:
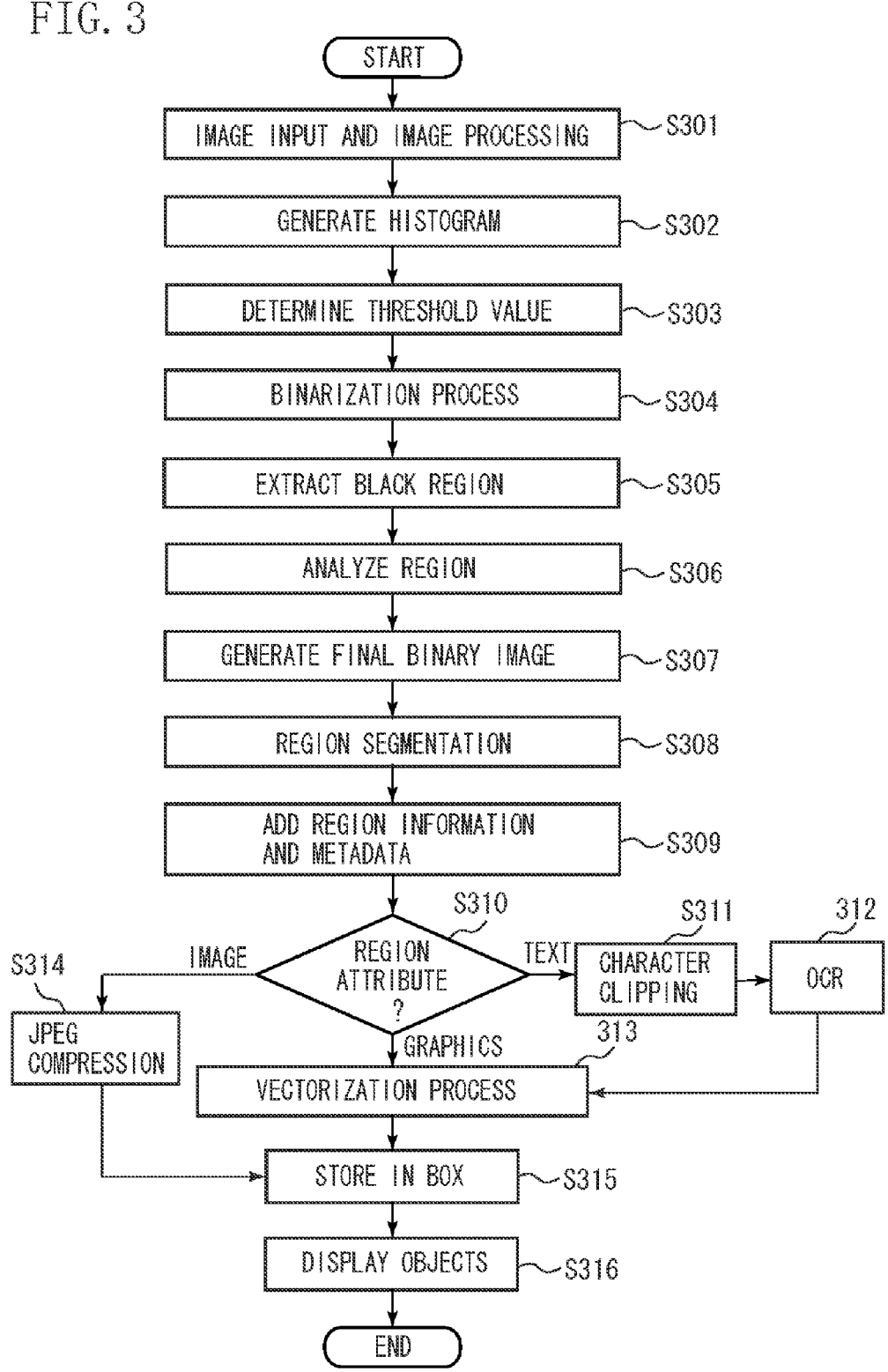
FIG. 3 is a flowchart illustrating an example of a region segmentation process.

FIG. 3 is a flowchart illustrating an example of the process of object segmentation in a document image.

In step S301, the image reading unit 201 reads the document. The data processing unit 206 then performs image processing, when the document is scanned, and acquires document image data (e.g., multivalued input image data). The image processing performed when the document is scanned includes color processing and filter processing. In the present exemplary embodiment, document image data acquired by scanning a paper document is input in step S301. However, embodiments of the present invention are not limited to scanning a paper document, and, for example, image data received from a PC via a network can also be input as the document image data.

In step S302, the data processing unit 206 generates a histogram for checking a color value distribution of the image.

In step S303, the data processing unit 206 determines a binarization threshold value used in a binarization process, based on the histogram generated in step S302.

In step S304, the data processing unit 206 performs the binarization process on the image data using the binarization threshold value determined in step S303 and acquires a binary image.

In step S305, the data processing unit 206 detects a black pixel portion in the binary image acquired by performing the binarization process in step S304. The data processing unit 206 may detect the black pixel portion using a process such as one or more of an outline tracing process and a labeling process.

In step S306, the data processing unit 206 analyzes the extracted black pixel region and determines whether the black pixel region includes a reversed character (i.e., a white character on a black background). For example, the data processing unit 206 may compare the number of black pixels and the number of white pixels in the black pixel region. If the number of black pixels is greater than the number of white pixels, the data processing unit 206 may further determine whether the size of the connected white pixels is within a range of a predetermined character size. If the size of the connected white pixels is within the range of a predetermined character size, the data processing unit 206 may determine that the black pixel region includes a reversed character.

In step S307, if it is determined that the black pixel region includes a reversed character, the data processing unit 206 reverses the black and white pixels in the black pixel region including the reversed character and generates a final binary image.

The binarization process performed in steps S302 to S307 can be performed using a binarization process, such as for example a known binarization process. In a case where the binarization process is performed on an input image 401 illustrated in FIG. 4, a final binary image 402 is acquired.

In step S308, the data processing unit 206 segments the final binary image into regions of each attribute (e.g., one or more of an image region, a graphics region, and a text region). The technique used to perform the region segmentation process on the binary image can be, for example, a known technique. As a result, the data processing unit 206 determines positions of the regions for each attribute (i.e., objects) included in the binary image.

In step S309, the data processing unit 206 generates region information (i.e., object information) including region attribute information and position information for each region (i.e., object) determined by the region segmentation process performed in step S308. Further, the data processing unit 206 generates additional information (i.e., index information) used when searching an object. Such additional information can include document image identification (ID) (i.e., identifier) to be assigned to each input image, and time of the image input (e.g., the time at which the image is scanned). The data processing unit 206 then adds the additional information to the object information. As a result, the same document image ID is assigned to regions (i.e., objects) extracted from the same document image.

In step S310, the data processing unit 206 determines the attribute of each region stored in the region information. According to the attribute determined in step S310, the data processing unit 206 may perform the processing of steps S311 to S314. Then, in step S315, the data processing unit 206 stores information about each region in a BOX of the storage unit 202. In the present exemplary embodiment, a storage region (e.g., storage or database) that stores information about a document image and a region (object) will be referred to as a BOX.

If the data processing unit 206 determines that the region (i.e., object) is an image region (IMAGE in step S310), the processing proceeds to step S314. In step S314, the data processing unit 206 extracts the image region portion from the original document image data based on position information of the region. The data processing unit 206 then performs a Joint Photographic Experts Group (JPEG) compression on a multivalued image in the extracted image region. In step S315, the data processing unit 206 stores in the BOX the JPEG-compressed data in the image region associated with region information (object information) about the region.

If the data processing unit 206 determines that the region (object) is a graphics region (GRAPHICS in step S310), the processing proceeds to step S313. In step S313, the data processing unit 206 extracts the graphics region portion from the binary image based on information about the region, and performs a vectorization process on the binary image in the extracted graphics region.

In the vectorization process, vectorized (path-converted) data (i.e., vector data) can be acquired by detecting an outline of a black pixel in the binary image and performing function approximation of the outline. The data processing unit 206 checks a color distribution of pixels in the original document image data corresponding to a position of the object determined as graphics (i.e., a position of a black pixel in the graphics region on the binary image). The data processing unit 206 thus determines a representative color of the graphics object, or color information of the graphics object. For example, the data processing unit 206 can determine the representative color by acquiring an average color based on the color distribution. A plurality of colors can be selected as the representative color.

In step S315, the data processing unit 206 stores in the BOX the vectorized (path-converted) data and the representative color information, associated with the region information (object information) of the region.

Returning to step S310, if the data processing unit 206 determines that the object is a text region (TEXT in step S310), the process proceeds to step S311. In step S311, the data processing unit 206 performs a character clipping process (e.g., character extraction process) in which each character is clipped discretely from the text region. For example, a character string can be cut out by checking a histogram in vertical and horizontal directions for the binary image in the text region. Further, a character can be cut out based on a histogram in a direction perpendicular to the character string, so that a character image can be extracted, character by character. The character clipping process is not limited to the above-described process, and other known techniques can also be used.

In step S312, the data processing unit 206 performs an optical character recognition (OCR) process (e.g., character recognition process) on the characters cut out in step S311 and acquires character code information of the OCR result.

In step S313, the data processing unit 206 performs a vectorization process on the character image cut out from the binary image in step S311 and acquires vectorized (path-converted) data. The vector data can be acquired, for example, by performing a process similar to the above-described vectorization process performed on the graphics region. However, the vectorization process is not limited to the above-described process, and other methods can be used.

For example, a font type of the character image can be identified and combined to the OCR result acquired in step S312, to generate vector data including the vector data of the identified font and the character code of the OCR result. Further, the data processing unit 206 can determine a representative color (e.g., color information of each character) of the graphics object by checking a color distribution of pixels in the original document image data corresponding to a position of the object determined to be a character (i.e., a position of black pixels in the character region of the binary image). The representative color can be determined, for example, by acquiring an average color of each character.

In step S315, the data processing unit 206 stores in the BOX, the character code information of the OCR result acquired in step S312, and the vectorized (path-converted) data (vector data) and the color information of the character acquired in step S313, associated with the region information (i.e., object information) about the region. Further, an index (e.g., keyword) extracted from the OCR result can be stored in the region information as metadata, or the entire character string of the OCR result can be made to be usable in a full-text search.

In step S316, the data processing unit 206 displays the segmented objects separated into each region. For example, the object extraction process described in steps S308 to S314 may be performed on the input image (e.g., document image) 401 and the binary image 402 of the input image 401 illustrated in FIG. 4. As a result, region information (i.e., object information) of each region and drawing information (e.g., vector data or JPEG compression data) of each region may be acquired and stored in the BOX. The data processing unit 206 can thus display the object extraction results in units of objects (e.g., at least one of a text region, an image region, and a graphics region) that are included in the document image as illustrated in FIG. 5.

The above-described example process will be described in further detail below.

<Binarization Process>

According to this example process, the data processing unit 206 binarizes the input image into a monochrome image and performs an outline tracing, so that the data processing unit 206 extracts a pixel block surrounded by a black pixel outline. If an area of a black pixel block is greater than a predetermined threshold value, the data processing unit 206 performs an outline tracing on white pixels inside the block and extracts a white pixel block. If there is a white pixel block whose area is greater than a predetermined area, the data processing unit 206 further extracts a black pixel block from the white pixel block. Further, the data processing unit 206 reverses the white and black portions in the reversed character region and acquires the final binary image. The binarization process is not limited to the above-described process, and known techniques can also be used.

<Object Extraction Process>

In the region segmentation (i.e., object segmentation) process performed in step S308 according to the example process, the data processing unit 206 extracts a black pixel block from the final binary image and classifies the extracted black pixel block based on the size and shape, into regions having different attributes. At this time, the data processing unit 206 determines that black pixel blocks within a predetermined distance belong to the same region and thus merges the regions. For example, a block having an aspect ratio close to one and having a size within a predetermined range is classified into a pixel block that corresponds to a character. Further, a portion in which adjacent characters are arranged in line and which can be grouped (merged) is classified into a character region. Further, a region in which indeterminate pixel blocks are scattered is classified into an image region, and other pixel blocks having arbitrary shapes are classified into a graphic region.

In the present exemplary embodiment, the regions may be classified as described above. However, the classification is not limited to the method described above, and known region segmentation techniques can also be applied. Further, a table attribute can also be added as a region attribute. In such a case, since a character attribute region can be extracted from the table attribute region, the OCR process and the vectorization process may be performed on the extracted character attribute region. The table attribute region portion other than the character attribute region can be vectorized similarly to the graphics region, to convert lines into vector data. As described above, the document image is segmented into regions (i.e., objects) for each attribute.

An example of the OCR (character recognition) process performed in step S312 will be described below.

The data processing unit 206 according to this example performs character recognition for a character image cut out from the character block in a unit of a character by using a pattern matching method to acquire the corresponding character code. More specifically, in the character recognition process, the data processing unit 206 compares an observation characteristic vector, which is given by converting the characteristics acquired from the character image into a numeric string having a several-tens-number of dimensions, with a dictionary characteristic vector that has been provided for every character type. As a result, a character type that is closest to the dictionary character vector becomes the recognition result.

Various methods may be used to extract the characteristic vector, including known methods. In one method, a character is divided into a mesh pattern, and a vector having dimensions corresponding to the number of meshes, which is given by counting character lines in each mesh block for every direction as line elements, may be used as the characteristic vector.

In order to perform the character recognition process for the text region, the data processing unit 206 may determine whether the text region is horizontally written or vertically written, a character string may be cut out in the determined direction, and the characters may then be cut out from the character string to acquire the character image as described in step S311. In the determination of the horizontal writing or the vertical writing, the data processing unit 206 may acquire a horizontal or vertical projection with respect to a pixel value in the text region. When the horizontal projection is widely dispersed, the data processing unit 206 determines that the corresponding text region is horizontally written. When the vertical projection is widely dispersed, the data processing unit 206 determines that the corresponding text region is vertically written.

In the case of dividing the text region into the character string and the characters, when the text region is horizontally written, the data processing unit 206 may use horizontal projection to cut out a line, and can cut out characters from the vertical projection with respect to the cut-out line. In contrast, when the text region is vertically written, the data processing unit 206 performs a reversed process with respect to the horizontal writing. The sizes of the characters can also be detected when the character recognition process is performed.

An example of the vectorization process performed in step S313 will be described below.

When a vectorization process is performed on a text region, the data processing unit 206 may perform a font recognition process for each character in the character block acquired by the OCR process in Step S313.

The data processing unit 206 may provide the dictionary characteristic vectors, the number of which corresponds to the number of character types, for use in the character recognition process. Further, the dictionary characteristic vector sets may be provided, the number of which corresponds to the number of character shapes (i.e., font types). The font type of the character can be recognized by outputting the font type along with the character code when the matching is performed.

The data processing unit 206 may then convert the information about the character portion into vector data, using the outline data that has been prepared in advance, according to the character codes acquired by the character recognition process and the font information acquired by the font recognition process. When the document image is a multivalued image (a color image), the representative color of each character may be determined based on the multivalued image, and may be recorded along with the vector data.

The vectorization process performed on the text region can generate vector data by performing a similar process as the vectorization process performed on the graphics region, as will be described below. Further, if the data processing unit 206 determines that an image recognition result of a text image is correct, the data processing unit 206 may perform a vectorization process using outline data of the font. On the other hand, the data processing unit 206 can also perform a vectorization process based on an image outline similarly as in the graphics region to be described below if the data processing unit 206 determines that the character recognition of the character image is probably incorrect.

When applying a vectorization process on the graphics region, the data processing unit 206 can convert the outline of the black pixel block extracted from the corresponding graphics region into vector data.

For example, the data processing unit 206 may delimit the sequence of points of the pixels forming the outline at points to be regarded as angles, and the delimited sections may be approximated to be a partial straight line or curved line. The angles are points having curvatures that are larger than a predetermined threshold value.

Figure 6:
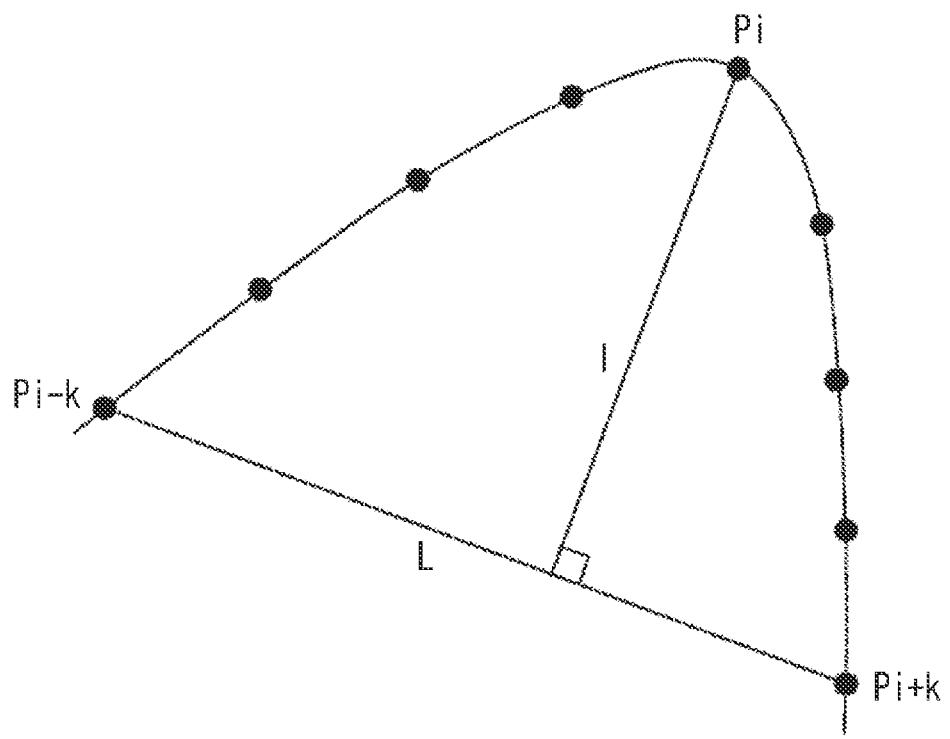
FIG. 6 illustrates an example of a vectorization process.

More specifically, a chord L may be drawn between a point Pi−k and a point Pi+k, which are respectively apart from an arbitrary point Pi by k points, as illustrated in FIG. 6. A point having a curvature that is larger than a predetermined threshold value is a point having a distance 1 between the chord L and the point Pi, which is greater than a predetermined threshold value. When the result of division of the length of the chord between the point Pi−k and the point Pi+k by the length of the arc is represented by R, a point having a value R smaller than a threshold value can be regarded as an angle. In the sections divided by the angle, straight lines can be vectorized by using a computation expression, such as for example a least squares method, with respect to the sequence of points, and curved lines can be vectorized by using, for example, a cubic spline function or the like.

If there is a white pixel block inside a black pixel block, the vector data can be generated by performing a vectorization process as described above on the white pixel block.

As described above, the section-line approximation of the outline can be used to vectorize the outline of a graphic having an arbitrary shape and to generate the vector data. When the document image is a color image, the color of each graphic, which is extracted from the color image, is recorded along with the vector data.

Figure 7:
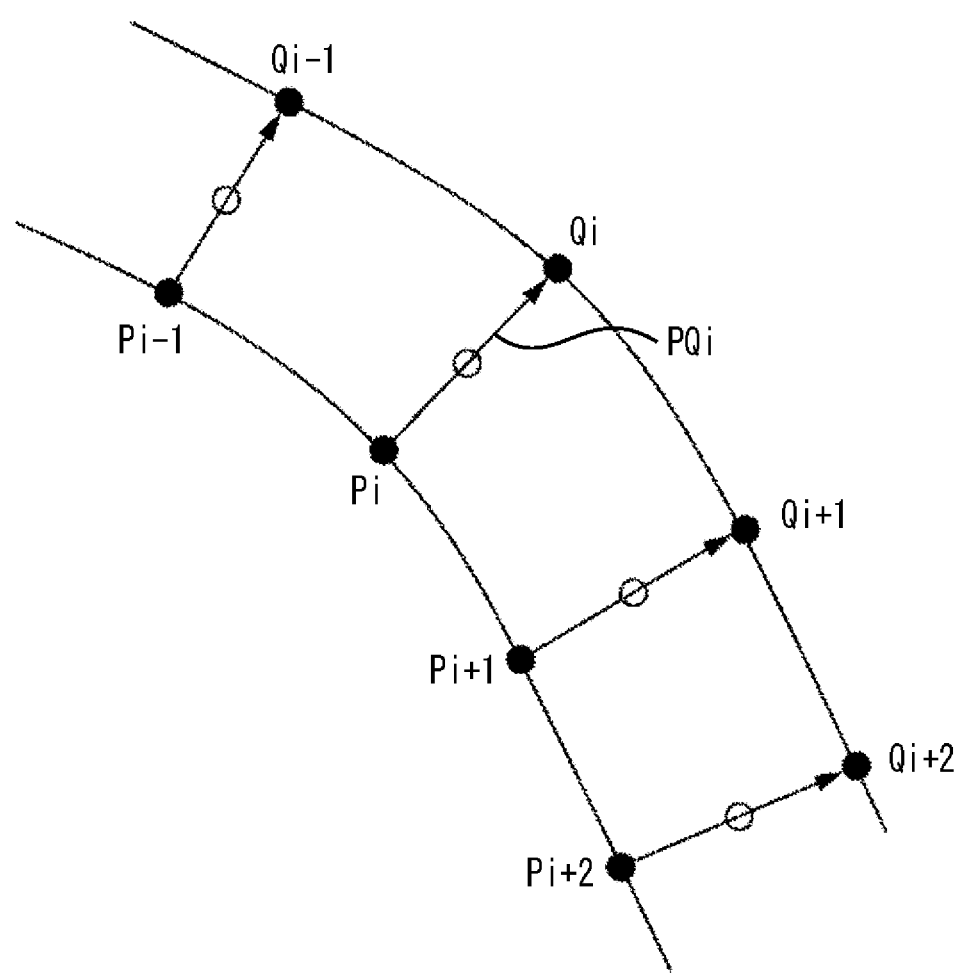
FIG. 7 illustrates an example of a vectorization process.

A line-form graphic can also be expressed as vector data including line width information instead of directly using the outline of a graphics as described above. For example, as illustrated in FIG. 7, when two outlines are adjacent to each other in one section, the two outlines can be expressed as a line having a certain width by putting the two lines together.

For example, lines may be drawn from points Pi on one outline to points Qi on another outline, which have the shortest distances from the points Pi respectively. When the distances PQi are approximately of a constant length in the target section, the medians of the distances PQi are approximated to a straight line or curved line as the sequence of points in the target section and the width of the line is set to an average value of the distances PQi.

Figure 8:
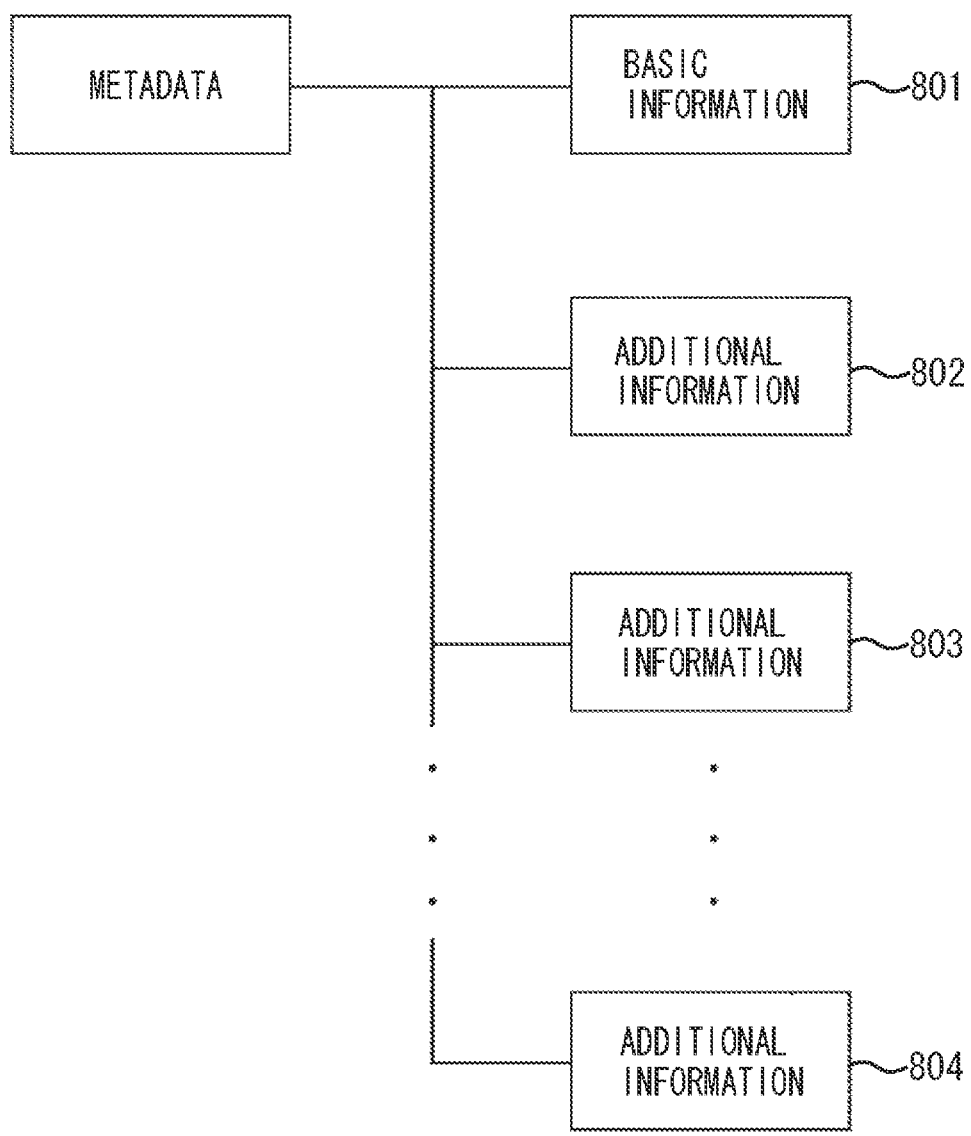
FIG. 8 illustrates an example of a configuration of metadata.

FIG. 8 illustrates an example of a configuration of metadata having a hierarchical structure.

Referring to FIG. 8, at least one of the date and time at which the object is created, the creator, and a document ID, may be included in basic information 801. Information about one or more of the shape of each object and the position of each object in the document may be included in each of additional information 802, 803, and 804. A keyword created from the OCR result can be further stored in the additional information. The additional information 802, 803, and 804 thus added to each of a plurality of objects extracted from one document image, associated with the basic information 801 added to the entire document image, for each document image, may be stored as metadata.

In the present exemplary embodiment, objects can be searched and reused as will be described below. Objects, which are selected from a group of objects as a result of a search based on a user instruction, can be combined and laid out to create a new document. A search keyword used to search for each object in the newly created document is reflected to metadata of other objects that are laid out together with the object. As a result, a combination of objects can be easily searched to create a new document that uses a similar combination of objects, so that the operability in reusing the objects can be improved.

Further, the metadata can include security information. In such a case, the users who are allowed to use each object can be restricted. Since the metadata is of a hierarchical configuration including additional information 802, 803, and 804, a security level can be changed according to each hierarchical level. Additionally, such hierarchical configuration may be convenient in separating information that can be viewed by any user from information that can only be viewed by a specific user.

A description language such as XML may be used as a metadata format. However, embodiments according to the present invention are not limited to this, and the metadata can also be managed using a table or the like.

Figure 9:
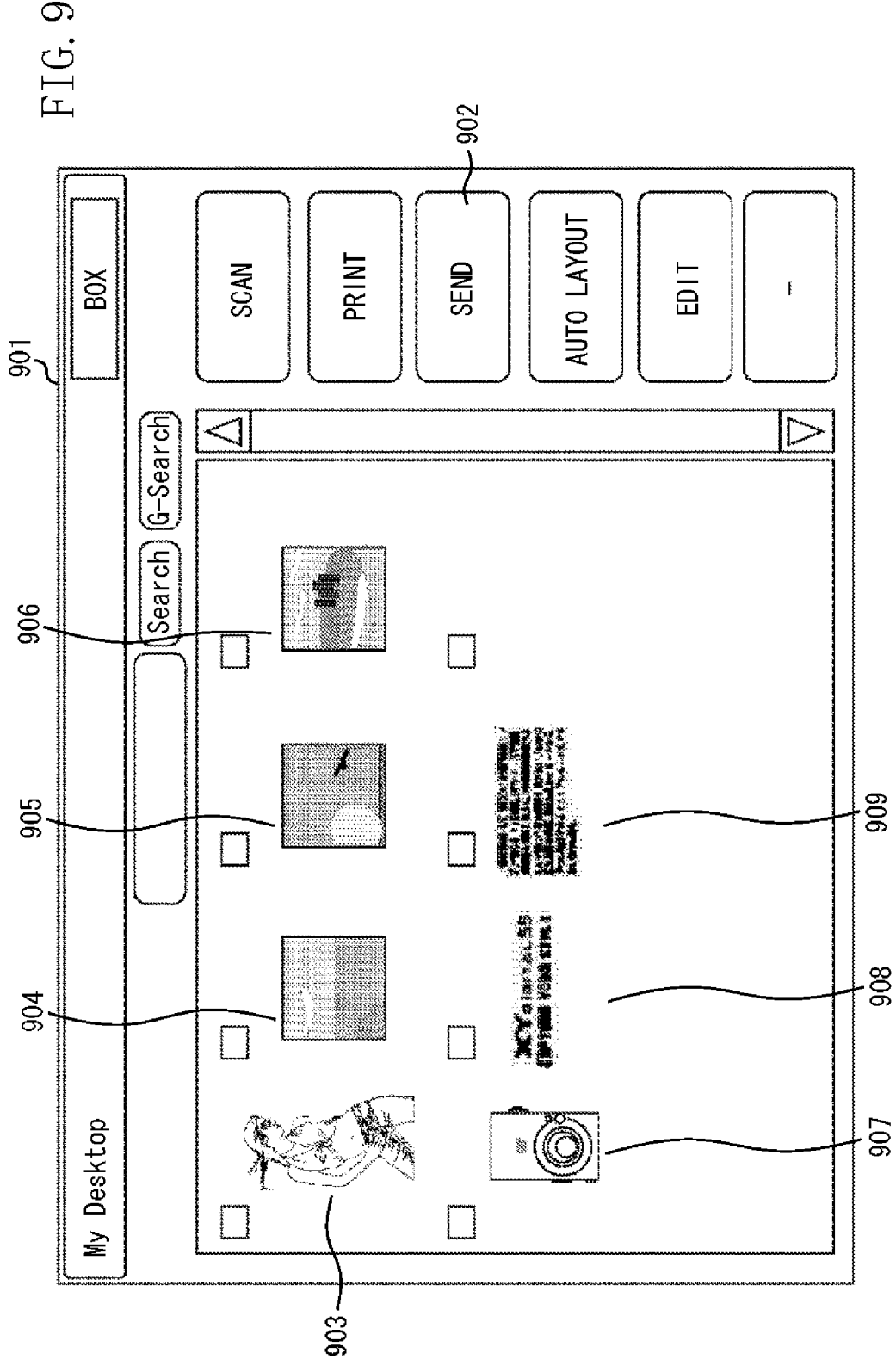
FIG. 9 illustrates an example of a user interface (UI) screen displayed on the MFP.

Returning to the flowchart illustrated in FIG. 3, in step S316 of this example, the data processing unit 206 displays the result of the input image, which is segmented into objects and stored in the BOX, on a UI screen as illustrated in FIG. 9. FIG. 9 illustrates an example of objects displayed on a UI screen 901 of the MFP acquired by segmenting the objects in the document illustrated in FIG. 4 into each region, and performing the metadata generation process, the vector data generation process, and the BOX storage process thereon.

Figure 4:
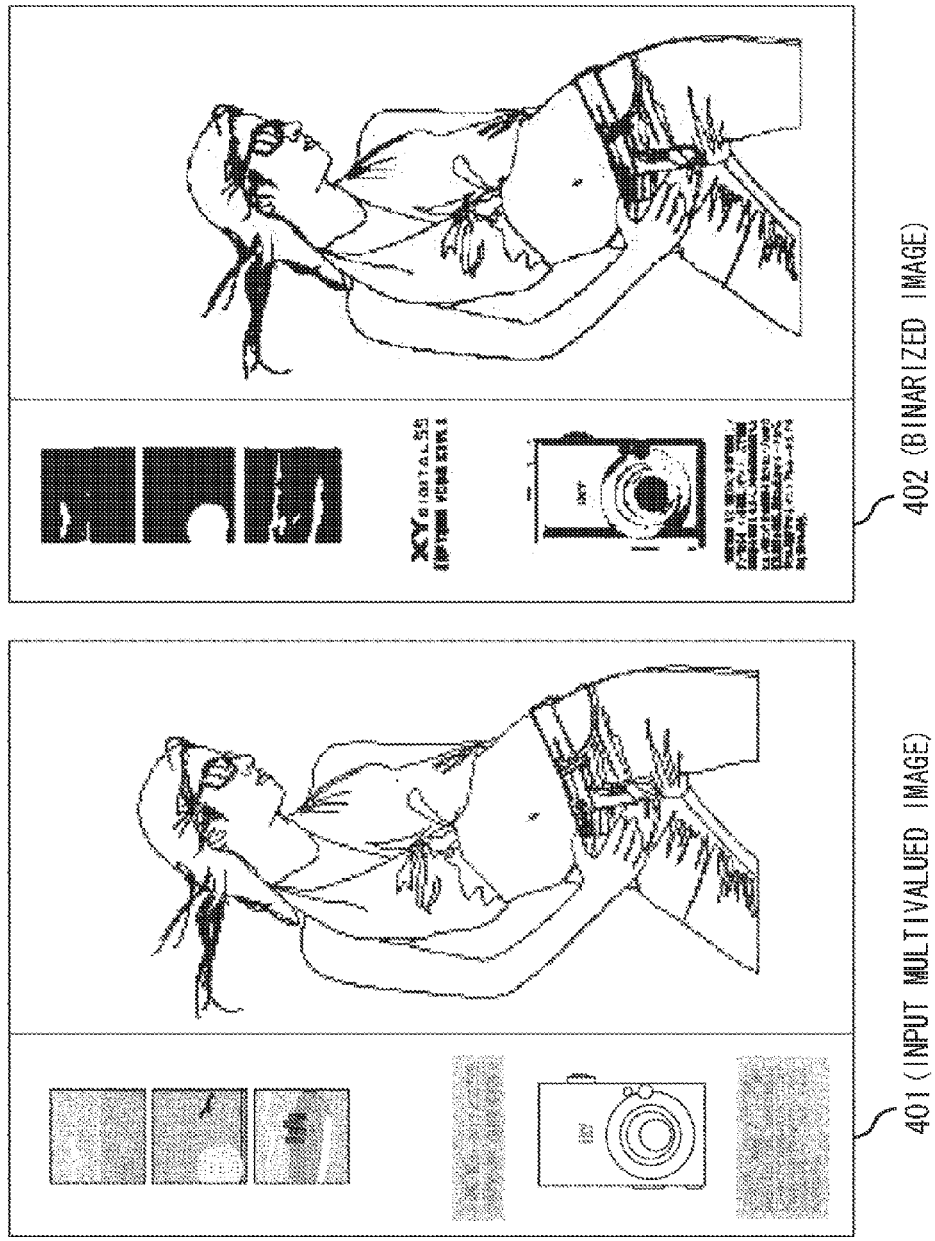
FIG. 4 illustrates an example of a document that is to be read.

Referring to the example shown in FIG. 9, seven objects of each region are extracted from the document illustrated in FIG. 4 and displayed as objects 903, 904, 905, 906, 907, 908, and 909 on the UI screen 901. When the user selects an object of a region, the user can also refer to a content of the metadata associated with the selected region.

In the example as shown, when the user presses a send button 902, the selected object can be sent to a PC. Further, if the user selects a plurality of objects and executes an auto layout process, an example of which is to be described below, a document in which the selected objects are automatically laid out can be created.

Figure 10:
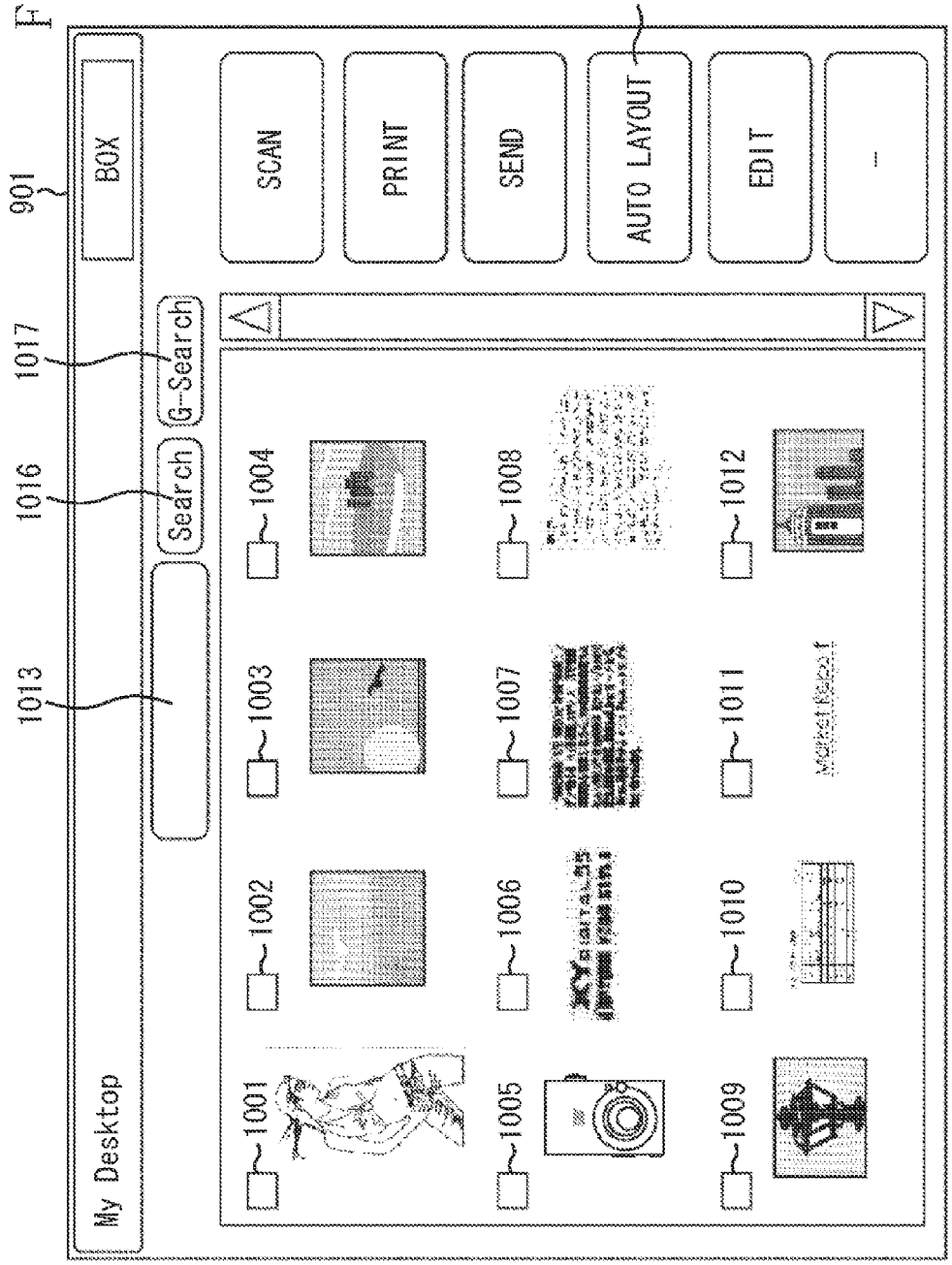
FIG. 10 illustrates an example of a UI screen of an auto layout process.

FIG. 10 illustrates an example of an auto layout process UI screen 901.

Referring to the example shown in FIG. 10, the objects displayed on the auto layout process UI screen 901 are acquired by performing, for example, the above-described processes that segment the objects into each region and that store the objects in the BOX. The objects may be extracted from a plurality of documents and stored in the BOX. Check buttons 1001, 1002, 1003, 1004, 1005, 1006, 1007, 1008, 1009, 1010, 1011, and 1012 are provided for each of the objects as a user interface for the user to select an object. The objects displayed on the UI screen illustrated in FIG. 10 may originally be stored in the BOX of the storage unit 202.

A search key input box 1013 may be displayed on the UI screen 901 for the user to input a keyword to search for an object from the plurality of objects. An object can be searched for by inputting a keyword in the search key input box 1013 via the input unit 204 by the user.

The search may be performed based on the additional information illustrated in FIG. 8. For example, the search may be performed by determining whether additional information 802, 803, and 804 assigned to each object meet the keyword input in the search key input box 1013. Then, the object whose additional information matches the keyword may be displayed on the UI screen 901.

If the user presses an auto layout button 1014, the objects selected using the check buttons 1001 to 1012 may be automatically laid out, and a new document may be created.

The object search process will be described in detail using a specific example below.

Figure 11:
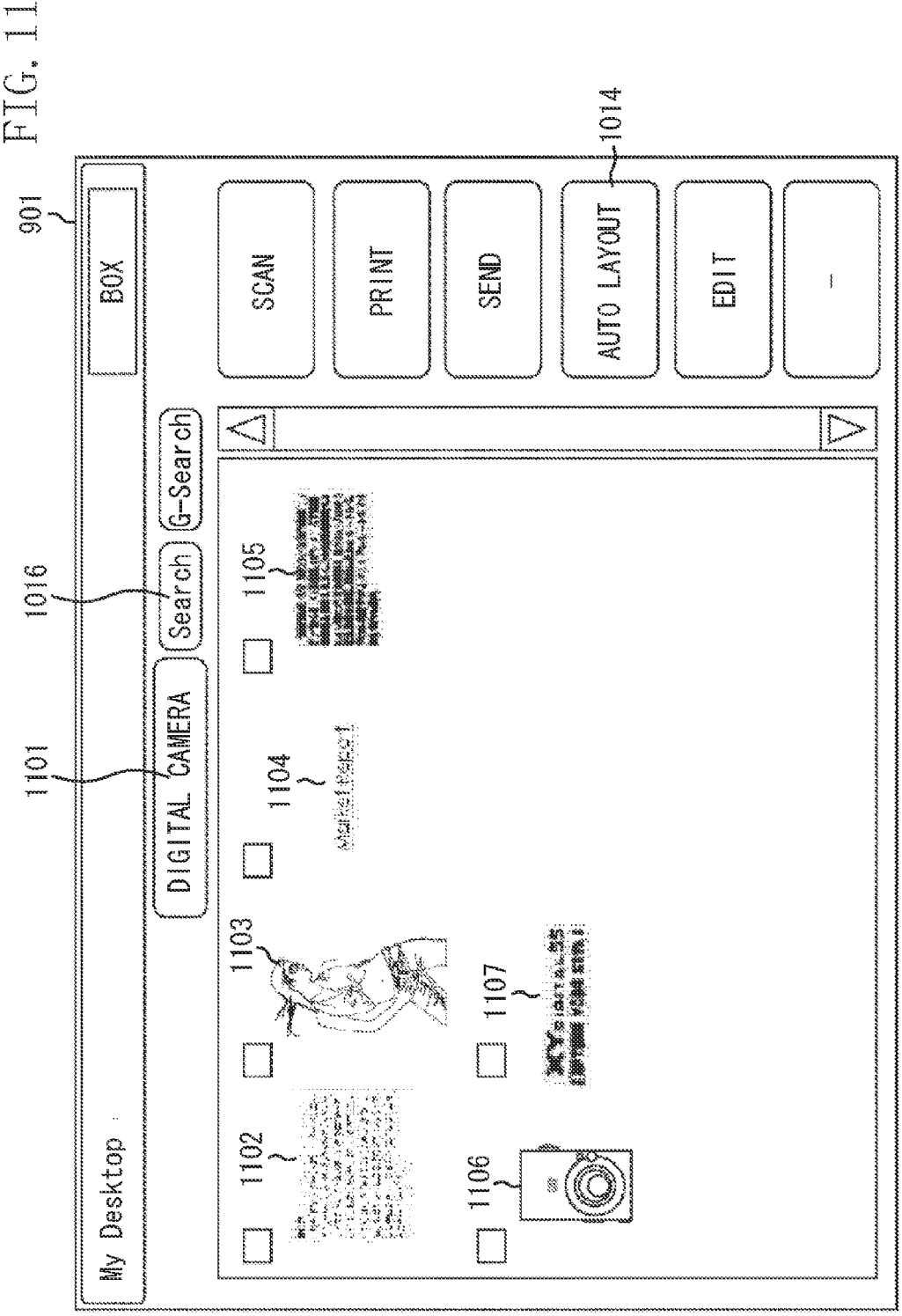
FIG. 11 illustrates an example of a UI screen displaying an object search result.

FIG. 11 illustrates an example of the screen 901 displayed when the user inputs "digital camera" as a keyword in a key input box 1101 via the input unit 204, presses a search button 1016, and then performs a search. A plurality of objects 1102, 1103, 1104, 1105, 1106, and 1107 displayed on the UI screen 901 illustrated in FIG. 11 is a hit example of the result from the keyword search.

Figure 12:
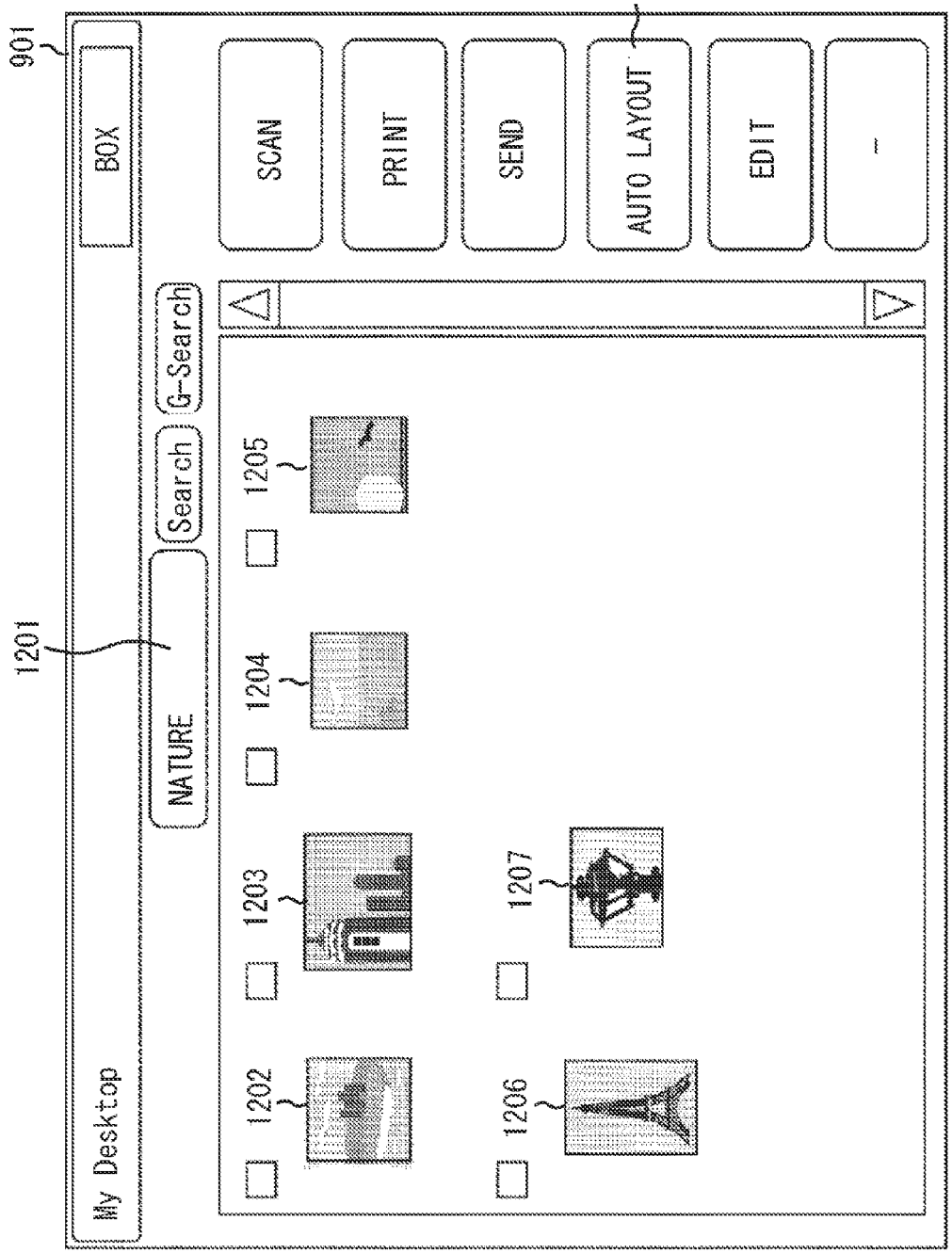
FIG. 12 illustrates an example of a UI screen displaying an object search result.

On the other hand, FIG. 12 illustrates an example of a result of a search performed when the user inputs "nature" as a keyword in a key input box 1201. Six objects 1202, 1203, 1204, 1205, 1206, and 1207 are displayed as a search result.

The displays on the UI screens illustrated in the examples of FIGS. 11 and 12 can be switched by inputting a search keyword by the user. Further, the user can switch the search results to be displayed by temporarily saving each of the search results and by operating a search result screen switching button.

An object selection operation will be described below with reference to FIGS. 13 and 14.

Figure 13:
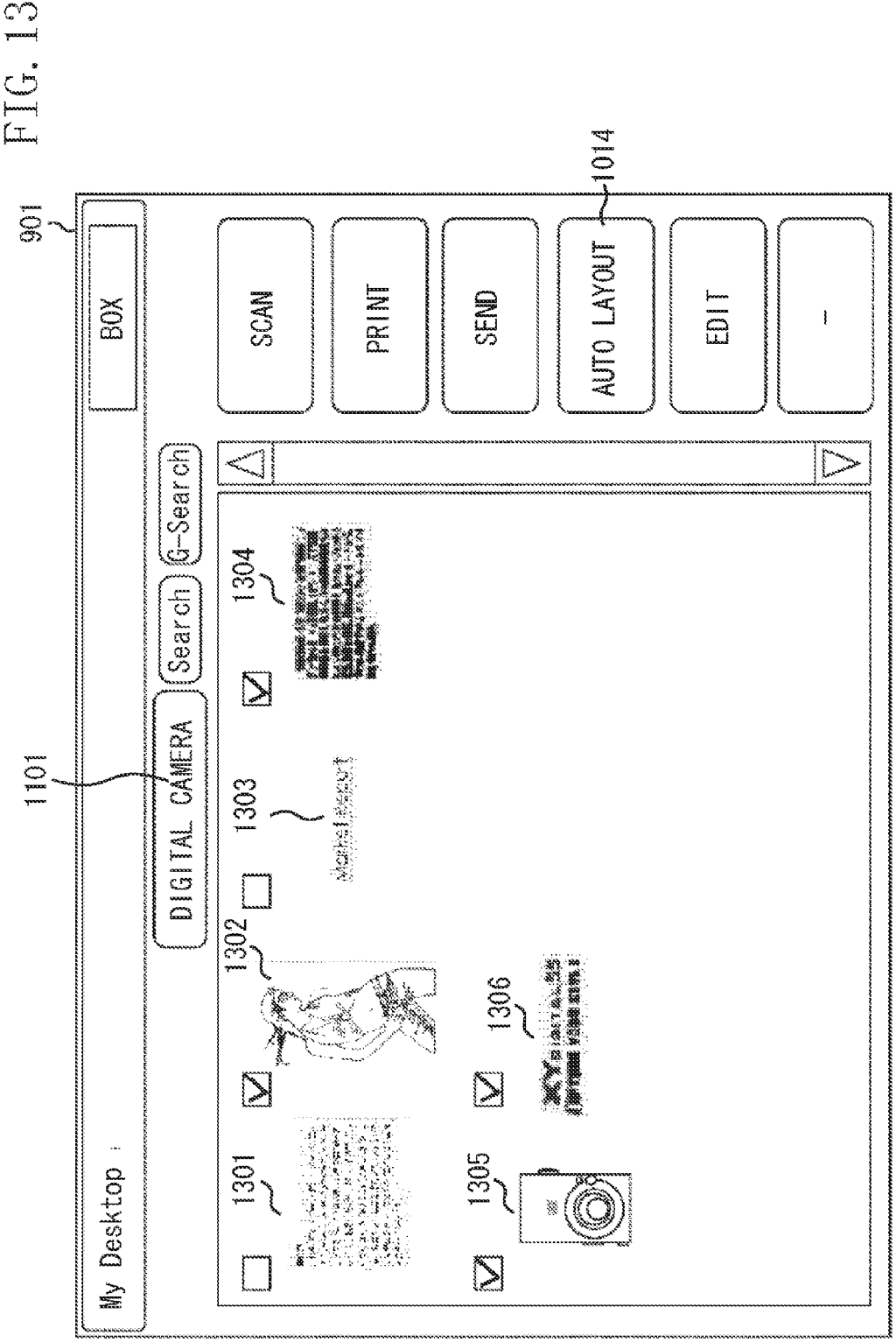
FIG. 13 illustrates an example of a UI screen displaying an object selection.

FIG. 13 illustrates an example of a state where the user selects objects using check buttons from among the objects that are displayed on the UI screen 901 as a result of the search performed by using a keyword "digital camera" as illustrated in FIG. 11. In the example illustrated in FIG. 13, four objects (i.e. 1302, 1304, 1305, and 1306) are selected using check buttons, and two objects (i.e. 1301 and 1303) are not selected.

Figure 14:
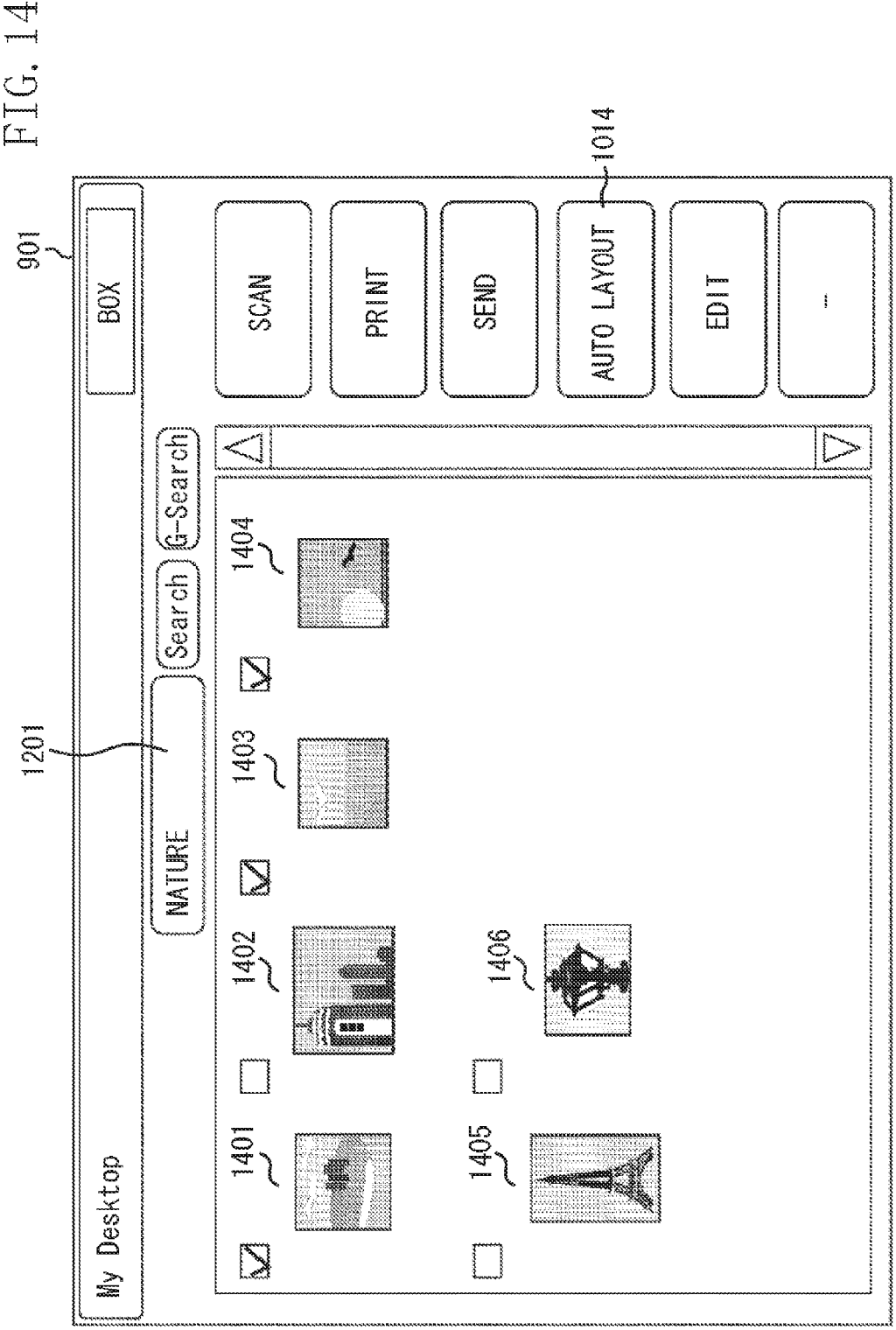
FIG. 14 illustrates an example of a UI screen displaying an object selection.

FIG. 14 illustrates an example of a state where the user selects a plurality of objects from a result searched by using a keyword "nature" as illustrated in the example of FIG. 12. In the example illustrated in FIG. 14, three objects (i.e. 1401, 1403, and 1404) are selected using check buttons, and three objects (i.e. 1402, 1405 and 1406) are not selected.

As described above, the user selects seven objects in the present exemplary embodiment. The process of combining and laying out such objects to create a new document will be hereinafter referred to as a re-layout process. More specifically, in a re-layout process, a new document is generated using objects selected by the user from a plurality of objects searched for using one or a plurality of keywords. Further, a re-layout process in which the selected objects are automatically laid out to create a new document will be hereinafter referred to as an "auto layout (i.e., auto re-layout)". On the other hand, a re-layout process in which the selected objects are laid out based on user instructions to create a new document will be hereinafter referred to as a "manual layout (i.e., manual re-layout)".

According to this example, when the user presses an auto layout button 1014 on the UI screen 901 illustrated in FIGS. 13 and 14, the objects that are currently selected are automatically laid out, and a new document is generated. An example of a result of such an auto layout is illustrated in FIG. 15.

Figure 15:
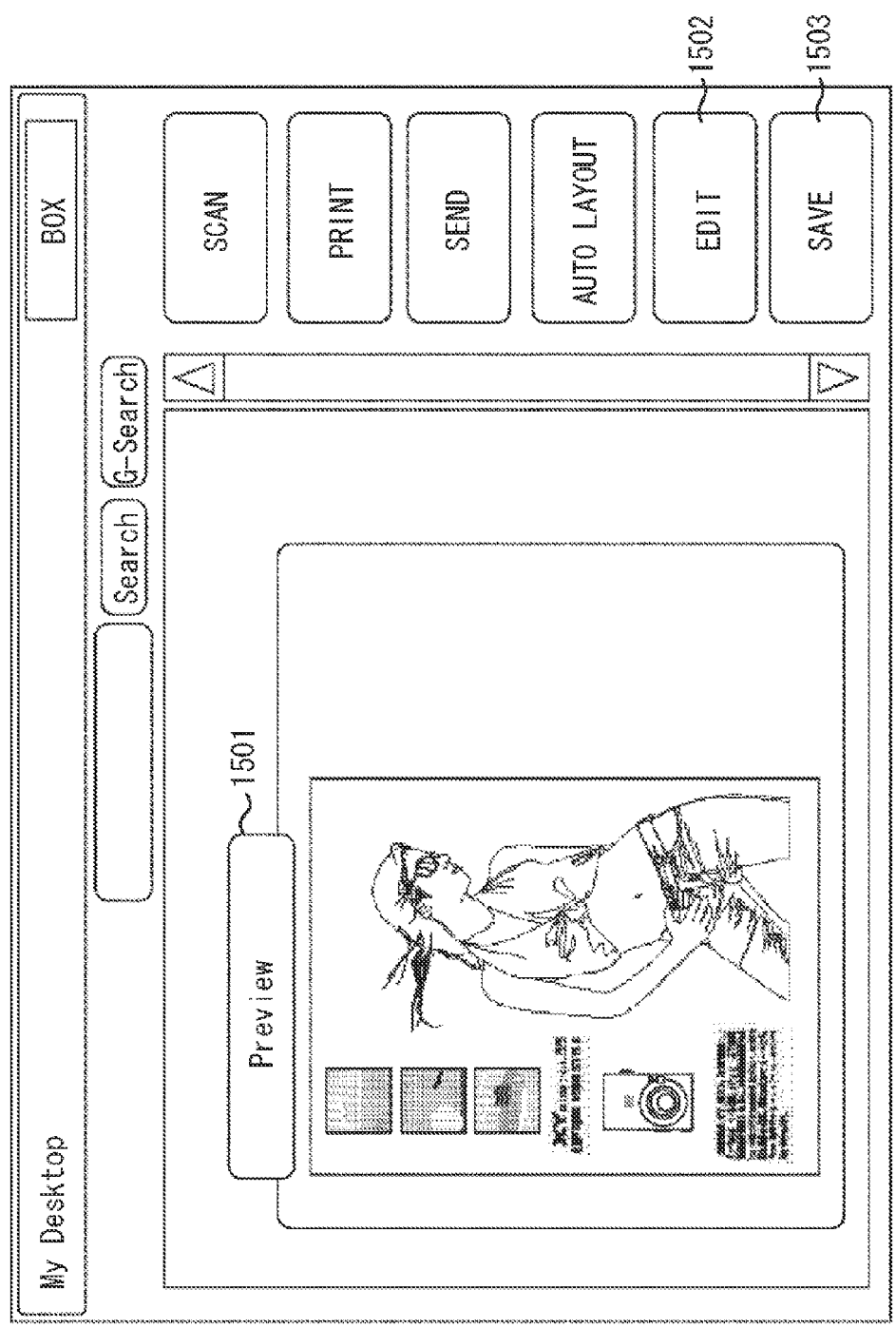
FIG. 15 illustrates an example of a UI screen displaying an auto layout result.

Referring to the example shown in FIG. 15, a preview screen 1501 displays the new document generated by the auto layout process. The new document displays a result of combining and laying out the objects (1302, 1304, 1305, 1306, 1401, 1403, and 1404) selected on the UI screen 901 illustrated in FIGS. 13 and 14. If the user presses an edit button 1502 according to this example, the user can provide instructions and corrections for the positions and sizes of the objects in the document displayed on the preview screen 1501. Further, if the user presses a save button 1503, the document currently displayed on the preview screen 1501 can be saved as a new document. Information about the combination of the objects used in laying out the new document (e.g., keywords used for searching for each object and the group ID) may additionally be stored in the additional information illustrated in FIG. 8 as group information. The stored group information can be used, for example, when the user wants to create a document using a similar combination, or when the user want to use it as a reference for objects that are candidates to be used in a combination.

Figure 16:
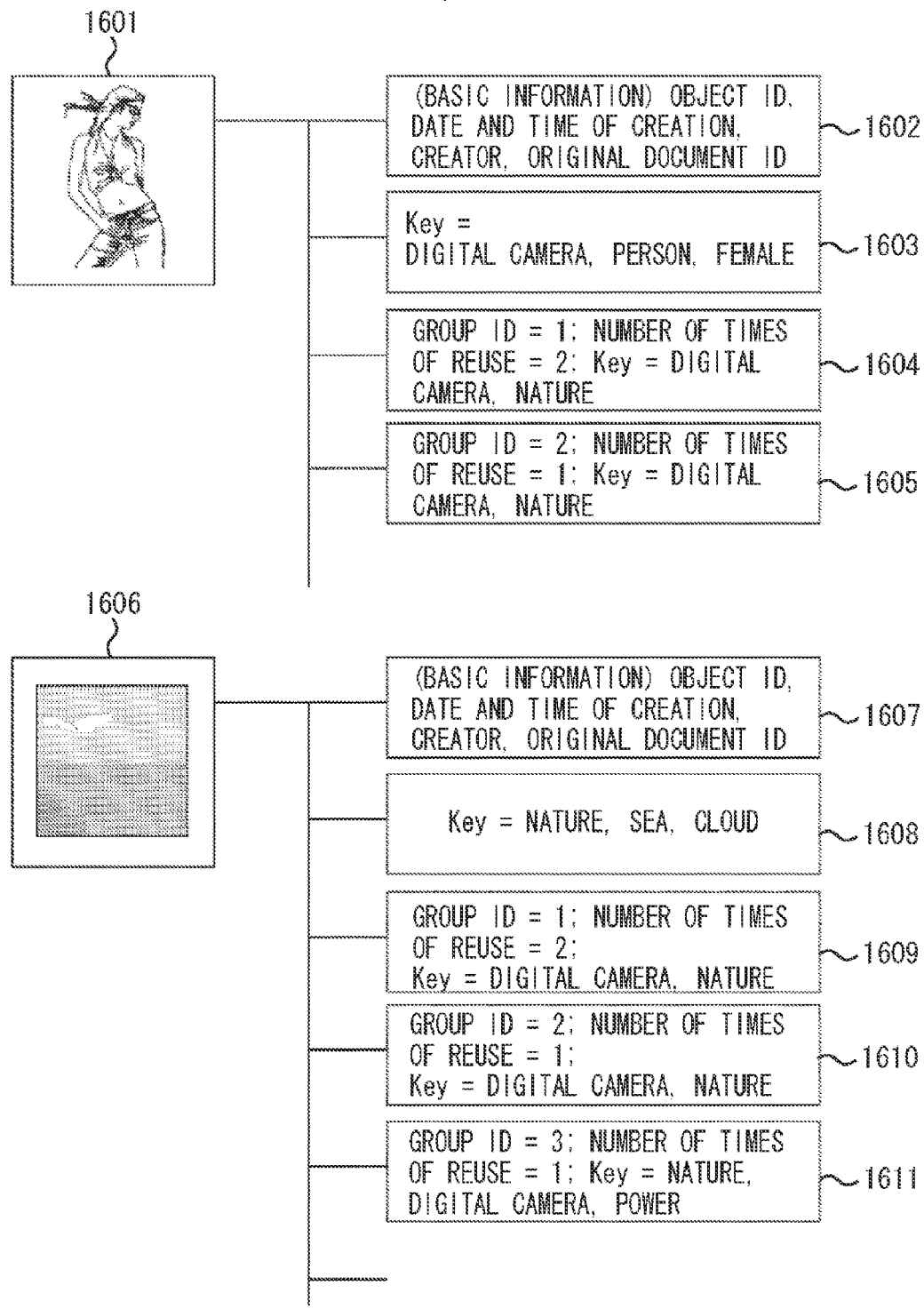
FIG. 16 is an example of a configuration of metadata illustrating a relation between objects according to an exemplary embodiment of the present invention.

FIG. 16 illustrates an example of additional information added to each object when a new document is created.

Referring to the example shown in FIG. 16, when each of the objects 1601 and 1606 is extracted from an original document to create a new document, basic information 1602 and 1607 may be added to the objects 1601 and 1606, respectively. Keywords 1603 and 1608 may also be added to the objects 1601 and 1606, respectively, based on, for example, an OCR result or a user key input, when the objects 1603 and 1608 are extracted from the original document to create the new document. Additional information 1603, 1604, 1605, 1609, 1610, and 1611 that are added when each of the objects 1601 and 1606 may be reused to create a new document, and may include at least one of a group ID, a keyword used when creating the new document, and a number of times the object is reused in each group.

The group ID according to this example is a number that is automatically allocated when a new document is created and stored. For example, since the objects 1601 and 1606 may both be used when a document of group ID=1 is created, additional information 1604 and 1609 may be added to the objects 1601 and 1606, respectively. Further, since the objects 1601 and 1606 may be used when a document of group ID=2 is created, additional information 1605 and 1610 may be added to the objects 1601 and 1606, respectively. As another example, when a document of group ID=3 is created, only the object 1606 is used. Therefore, additional information 1611 may be added to the object 1606.

For example, a group in which the objects are simultaneously used when a document is created may be described in the additional information of each object and associated with each object. Further, since keywords used when creating the document may also be stored in the additional information, the keyword used to search for a different object used together with the object may also be associated with the object. As a result, for example, the keyword "nature" used when creating a group may be added as a group keyword to an object that was not originally associated with the keyword "nature" (e.g., such as the object 1601). Therefore, the object 1601 can be searched for by the keyword "nature" when a group search is performed, even if the object 1601 cannot be originally searched for by the keyword "nature". As a result, each object can be searched for based on a relation in a group, so that a reusability of an object is improved.

Figure 17:
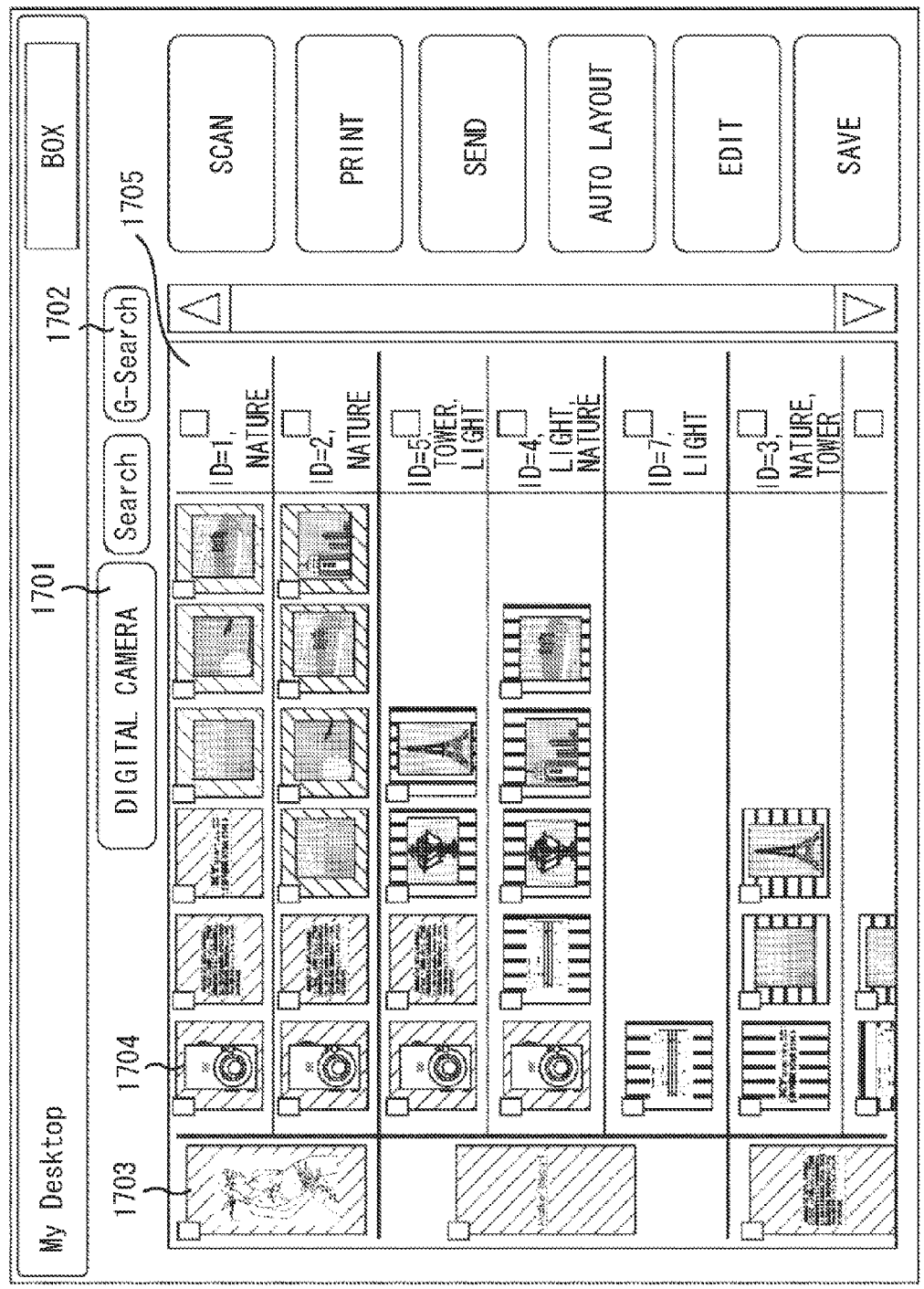
FIG. 17 illustrates an example of a group search result according to the first exemplary embodiment.

FIG. 17 illustrates an example of a screen displaying a result of a group search performed when the user inputs the keyword "digital camera" in a search key input box 1701 (e.g., similar to the search key input box 1013 illustrated in FIG. 10) and presses a group search button 1702 (e.g., similar to the group search button 1017 illustrated in FIG. 10).

When the user presses the normal search button 1016, a search may be performed based on a keyword (e.g., a keyword described in additional information 1603 or additional information 1608 illustrated in FIG. 16) originally assigned to each object. Therefore, a search result as illustrated in the example of FIG. 11 may be acquired.

On the other hand, according to this example, when the user presses the group search button 1702, a search may be performed using a group ID and a group keyword (e.g., group keywords and group IDs described in additional information 1604, 1605, 1609, 1610, and 1611 illustrated in FIG. 16) together with the original keyword, so that a search result as illustrated in the example of FIG. 17 is achieved. More specifically, objects used in a combination when creating a document in a past re-layout process may be displayed together in the screen illustrated in FIG. 17.

Referring to the example shown in FIG. 17, objects searched for using a keyword originally assigned to each object are displayed in a vertical direction, starting from an object 1703, in an order of higher degree of matching rate. Further, other objects, such as an object 1704, included in each group when each of the objects displayed vertically, in the column including the object 1703, that have been reused in the past are displayed in a related object display field on the right side adjacent to the vertically-displayed objects.

In the example illustrated in FIG. 17, the user searches for the object 1601 (illustrated in FIG. 16), and other objects that belong to group ID=1 associated with the object 1601 are displayed in the first row of the related object display fields. Further, other objects belonging to group ID=2 associated with the object 1601 are displayed in the second row of the related object display fields. As described above, each group may be displayed separately. A check box is provided for selecting each object displayed on the screen. A group information field 1705 on the right side of the related object display field displays a checkbox for collectively selecting objects as a group, a group ID, and a keyword used in past searches that is other than the keyword input in the search key input box 1701.

When the user clicks a keyword displayed in the group information field 1705 (i.e., the keyword used in searching a grouped object), a normal search is performed using the clicked keyword as a key. More specifically, the user can easily perform a search based on a keyword used in searching the object 1704 that has been used together with the object 1703 in the past. Since the same keyword is often assigned to similar objects, a different object that is similar to the object that has been used together in the past can be easily searched, so that the object may become more accessible.

Groups related to the searched object 1703 may be displayed in an order of higher usage from the top. Groups that are used the same number of times may be displayed in an order of the number of related objects to which the same keyword, as the search keyword input in the search key input box 1701, that have been originally assigned.

Further, in the example of the screen illustrated in FIG. 17, background colors (indicated by a shaded area) are displayed in the same color for the related objects to which the keyword input in the search key input box 1701 is originally assigned. More specifically, the background colors of the object 1703 searched for by the search keyword and the objects included in the related group, to which the same keyword is originally assigned, are the same. The display therefor is not limited to colors. For example, a background design or a mark can also be used instead of color to identifiably display whether the same keywords are assigned.

FIG. 18 is a flowchart illustrating an example of a group search process performed when the user inputs a search keyword and presses the group search button 1702 on the example of the UI screen illustrated in FIG. 17.

In step S1801, the data processing unit 206 searches for objects based on the input search keyword and a keyword assigned to each object, and sorts the searched objects in an order of high degree of matching. The first object is used as a related group search target in step S1802.

In step S1802, the data processing unit 206 searches information about the related group (such as a group ID and number of usage) based on the additional information of the target object.

In step S1803, the data processing unit 206 searches for other objects belonging to each related group based on the group ID.

In step S1804, the data processing unit 206 sorts the groups based on information about the related groups and information about the other objects belonging to each related group. The data processing unit 206 sorts the related groups so that a group with a higher possibility of usage is positioned higher, based on the number of times of usage of each related group, and keywords assigned to other objects belonging to each related group.

In step S1805, the data processing unit 206 determines whether there is a subsequent object in the search result acquired in step S1801. If there is a subsequent object (YES in step S1805), the processing returns to step S1802. On the other hand, if there is no subsequent object (NO in step S1805), the processing proceeds to step S1806.

In step S1806, the data processing unit 206 displays the object which is a result of the search using the search keyword, information about groups related to the object, and other objects belonging to each group, in a sorted order. As a result, the screen as illustrated in the example of FIG. 17 may be displayed.

In the result displaying screen illustrated in FIG. 17, the user can select an object by checking a checkbox of each object or each group. When the user presses the auto layout button, the user can create a new document using the selected objects.

As described above, according to the present exemplary embodiment, a group search can be performed based on a past usage history as illustrated in the example of FIG. 17 by storing group information when the object is reused, associated with each object, together with a keyword. Since a combination that is the same as or similar to a combination used in the past may often be reused, searchability and operability of the objects may be improved, and objects may be more easily reused by displaying the screen illustrated in FIG. 17. Further, an object that could not be as easily searched by a simple keyword search can be more easily searched. Thus, according to the present invention may provide an image processing apparatus that allows a user to relatively easily find an object that is to be reused.

In a second exemplary embodiment, an object shape that is processed when the object is reused in a group is stored together in the additional information of the group (e.g., such as additional information 1604, 1605, 1609, 1610, and 1611). The object shape can be processed by scaling, deformation, and rotation.

When the group search result is displayed as illustrated in the example of FIG. 17, each object may be displayed based on the shape to which the object is processed when the object was reused in the past. Each object may be displayed in the shape into which the object is most often processed, even if each object is differently shaped each time when the object is reused.

As a result, the user can view the object shape used in the past, so that the object shape can be used as a reference when laying out the objects to create a new document by performing a re-layout process.

Further, the shape that is most often reused is likely to be a recommended shape when reusing the object. Therefore, reusability of the object may be improved.

According to the above-described first and second exemplary embodiments, a control unit in the MFP may perform control of a search or display. The control unit of the MFP can include a CPU (e.g., a computer) that performs the search and display by reading a computer program and/or computer-executable instructions stored in a computer-readable storage medium (e.g., a hard disk). More specifically, the computer may function as a control unit that performs each process, by executing the program and/or computer-executable instructions.

Embodiments of the present invention are not limited to an MFP, and can also be achieved by a computer connected to the MFP or a general-purpose computer executing the program and/or computer-executable instructions and realizing aspects according to the above-described processes.

Further, aspects according to the present invention may be realized by a computer executing the computer program. However, a portion or all of the processes can also be realized by hardware such as an electric circuit. In such a case, each of the hardware may function as a control unit for performing each process.

As described above, according to the exemplary embodiments of the present invention, a group related to an object can be searched by storing information about an object group that is used together in the past as a group, and reusability of the object may be improved.

As a result, it may become easier to search for an object from among the stored objects, so that a new document can be more conveniently created by reusing the object.

Further, an object that cannot be readily searched by a simple keyword search can be more easily searched.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An information processing system comprising:
   an association unit configured to associate, according to a user's instruction, a first object which is retrieved with a first keyword and a second object which is retrieved with a second keyword different from the first keyword;
   a retrieval unit configured to be able to retrieve, with the first keyword, the first object and a third object which is not associated with the second object; and
   a display control unit configured to display the retrieved first and third objects in a first display field,
   wherein the display control unit is further configured to be able to display the second object in a second display field after the association of the first object and the second object, in a manner such that the retrieved first and third objects in the first display field and the second object in the second display field are visible together, and the second display field is distinguishable from the first display field, indicates that the second object in the second display field is associated with the first object in the first display field, and does not indicate whether or not the second object in the second display field is associated with the third object in the first display field, and
   wherein the display control unit is further configured not to display the second object in the second display field before the association of the first object and the second object.

2. The image processing system according to claim 1, wherein the display control unit is configured to display the second display field in the manner such that the second display field is associated with the first object in the first display field, but is not associated with the third object in the first display field.

3. The information processing system according to claim 2, wherein the second display field is displayed at a location based on a location of the first object in the first display field.

4. The information processing system according to claim 1, wherein the first, second and third objects include image data.

* * * * *